May 3, 1960 H. MIRZWINSKI 2,935,608
PULSE CONTROLLED ELECTRICAL CIRCUIT ARRANGEMENTS
Filed Nov. 7, 1956 3 Sheets-Sheet 1

INVENTOR:
Henryk Mirzwinski
BY: Baldwin & Wight
ATTORNEYS

INVENTOR:
Henryk Mirzwinski
BY: Baldwin & Wight
ATTORNEYS

May 3, 1960 H. MIRZWINSKI 2,935,608

PULSE CONTROLLED ELECTRICAL CIRCUIT ARRANGEMENTS

Filed Nov. 7, 1956 3 Sheets-Sheet 3

INVENTOR:
Henryk Mirzwinski
BY: Baldwin & Wight
ATTORNEYS 2,935,608
Patented May 3, 1960

2,935,608

PULSE CONTROLLED ELECTRICAL CIRCUIT ARRANGEMENTS

Henryk Mirzwinski, Chelmsford, England, assignor to Marconi's Wireless Telegraph Company Limited, London, England, a British company Application November 7, 1956, Serial No. 620,859

Claims priority, application Great Britain January 11, 1956

4 Claims. (Cl. 250—27)

This invention relates to pulse controlled electrical circuit arrangements i.e. to electrical circuit arrangements of the kind subjected to control by clamping, gating signal, sampling or other pulses.

Pulse controlled circuits are common in communication systems. For example, in a television system, a clamping circuit is used to periodically regulate the amplitude of a D.C. reference level. In radar systems, pulse controlled gating circuits are commonly used to periodically regulate the number of echo pulses accepted by the system. In general, however, known pulse controlled circuits are liable to incorrect operation due to the presence of impulsive noise occurring during the control pulse periods and the main object of this invention is to avoid this defect by means of simple and reliable apparatus. The term "impulsive noise" is used in its normally accepted sense, that is, noise which causes a sharp and substantial variation in the information signal waveform for a relatively short period of time, e.g. man-made interference lasting for a few micro-seconds.

According to this invention in its broadest aspect a pulse controlled electrical circuit arrangement comprises means, responsive to impulse noise, for eliminating control pulses within whose duration such noise occurs.

The nature of the response of said means will depend upon the results required and in particular whether protection against positively or negatively polarized noise (or both) is required.

When only impulsive noise of one polarity (e.g. positive) is to be considered, the said means may comprise means for producing pulses having an amplitude dependent upon the difference between a datum level and the amplitude of that part of the signal to be controlled occurring at the same time as said controlling pulses and means for passing only produced pulses having an amplitude exceeding a reference amplitude. When both polarities of impulsive noise are to be considered, the said means may comprise means for subtractively combining a signal containing impulsive noise with a similar signal which has been clamped in the normal way, and means for interrupting the passage of the controlling pulses whenever an output from said combining means is coincident in time with a controlling pulse.

Figure 4:
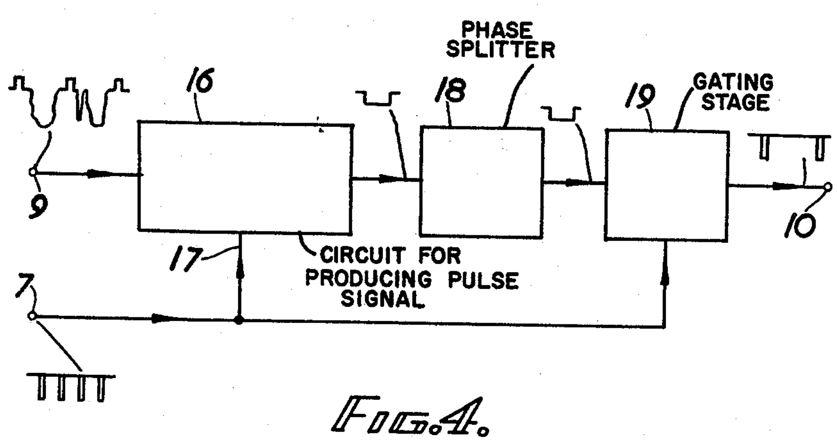
Figure 5:
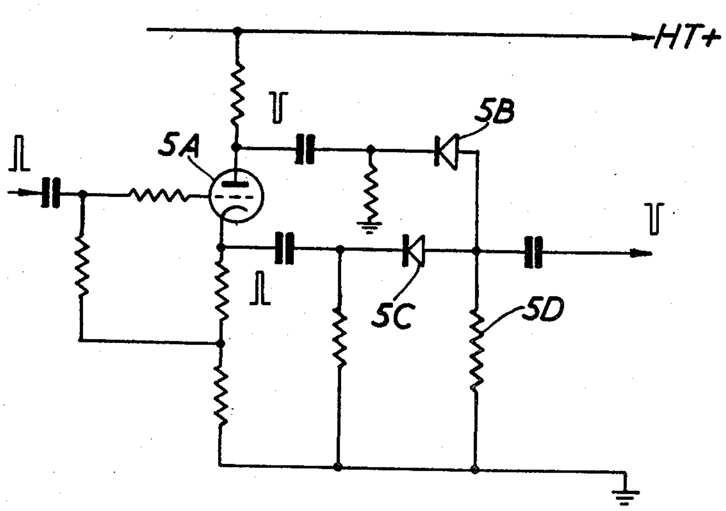
Figure 6:
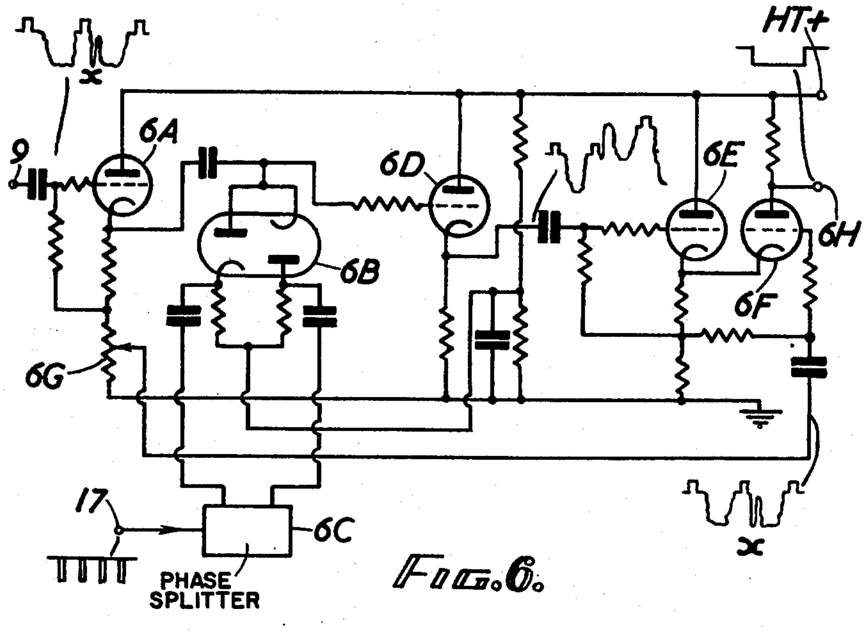
Figure 7:
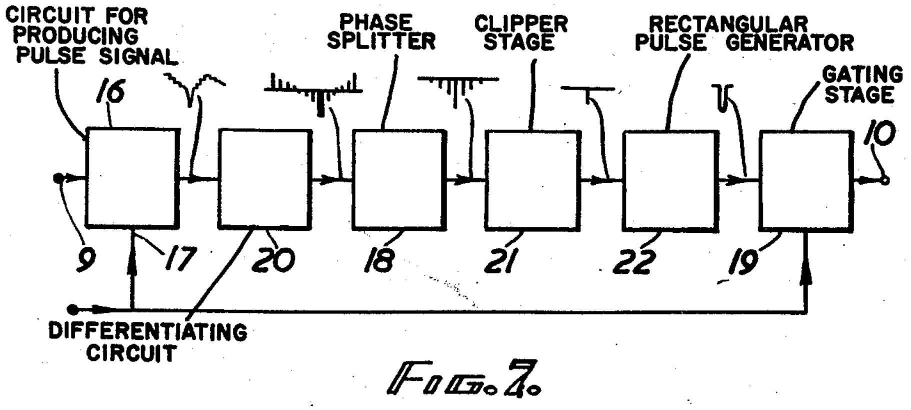

The invention is illustrated in and further explained in connection with the accompanying drawings, it being, for convenience, assumed throughout the description of the drawings that the invention is applied to pulse controlled circuits, of the kind commonly referred to as clamps, as used in television systems although, as will be self-evident from the description which follows, the invention is not limited to such circuits. In the drawings, Figure 1 shows a block diagram of a known clamp pulse controlled circuit, Figure 2 shows one embodiment of a clamp pulse controlled circuit according to the present invention, Figs. 3, 4 and 7 show details of Fig. 2 and Figs. 5 and 6 show details common to both Figs. 4 and 7.

Figures 1, 2, 3:
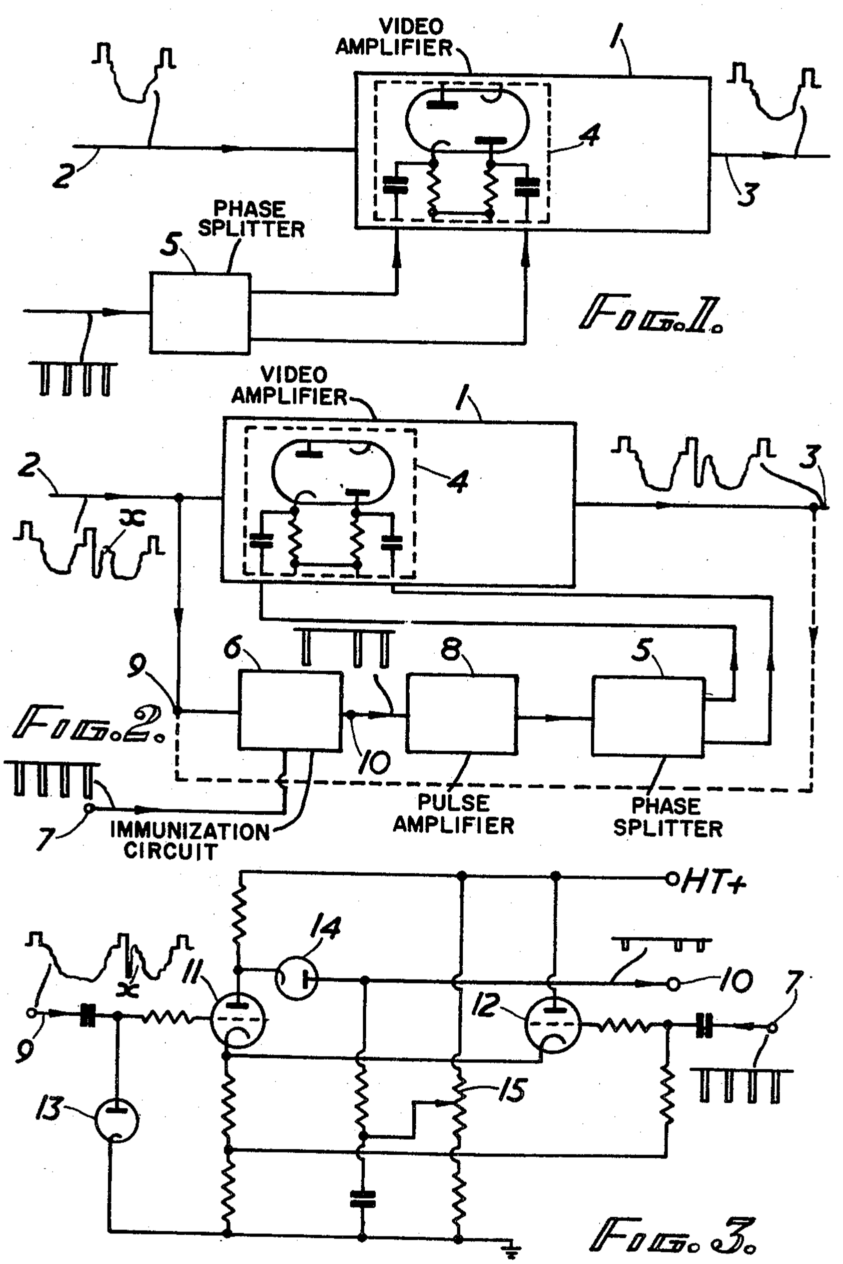

Referring to Fig. 1, which shows a conventional television-signal clamping arrangement, block 1 represents a video amplifier with an input at 2 and an output at 3. The signal passing through said amplifier is clamped, in manner well known per se, by a driven clamp 4, conventionally shown as a double-diode stage in block 1, controlled by clamping pulses derived from a phase-splitter 5 fed with negative going clamping control pulses as shown. In operation, the signal passing through the amplifier is clamped, i.e., brought to a fixed reference amplitude at appropriate times in its waveform, e.g. during back-porch intervals or synchronizing-pulse periods when the signal should always have the same amplitude. However, if impulsive noise in the signal coincides with a period of the signal during which clamping occurs, the clamp will operate with reference to the tip of the noise pulse instead of the reference amplitude. Thus a distorted television picture will be obtained.

In order to overcome the above described effect of impulsive noise the present invention arranges that the clamping circuit is not operated during the time when said noise is present in the signal to be clamped. One arrangement for achieving this is shown in Fig. 2 in which elements 1 to 5 inclusive are as described with reference to Fig. 1. In Fig. 2 the waveform of the video input signal at 2 is shown as containing a pulse $x$ of positive impulsive noise on the back-porch of the second line-synchronizing pulse, as also does the output signal at 3. (For comparison purposes this noise pulse $x$ is omitted from the corresponding wave forms in Fig. 1.) As will be seen later the arrangement of Fig. 2 does not remove impulsive noise (such as the pulse $x$) from the television signal but it does prevent erroneous clamping of the signal due to said noise. The input to amplifier 1 is tapped and fed to what will be referred to as an "immunization circuit" 6. This circuit, which will be described later, also receives negative going clamping control pulses which are eventually to control the operation of clamp 4, from an input 7. The operation of said immunization circuit is such that, when impulsive noise occurs at the same time as a clamping pulse, said clamping pulse is removed. This is shown graphically by the wave form at point 10, it being assumed that clamping of the signal in amplifier 1 is to take place during the back-porch interval and that the second back-porch interval in the waveform at 2 coincides with the second clamping control pulse at 7. Thus the immunization circuit output is, as shown, similar to the input at 7 except that the second pulse has been removed. Said output is amplified in a pulse amplifier 8 and passed to phase-splitter 5 to be fed as two trains of pulses in antiphase to control the operation of clamp 4 as in Fig. 1.

As will be appreciated, with the above described arrangement, any part of the video signal passing through the clamp circuit which ought to be clamped and which contains impulsive noise is not in fact clamped but left to find its own level which, in practice, is substantially that of the immediately preceding clamping operation.

The aforegoing description of the circuit of Fig. 2 has assumed that low frequency interference is absent from the television signal, i.e. the input to amplifier 1. This type of interference, e.g. mains hum and switching surges, is often present, however, particularly when the signal has been passed over a long cable link and, in such circumstances, it is usually necessary to remove substantially all of said interference from the television signal before employing said signal to immunize clamp pulses. To do this, unit 6 may be fed, not from the input to amplifier 1, as shown by the full line between 2 and 9, but from the output of the amplifier, as shown by the broken line between 3 and 9. With this arrangement, unwanted clamp pulses will be removed almost as soon as the impulsive noise appears in clamping stage 4 and at the same time the effect of clamping will substantially remove low frequency interference to a sufficient degree for most purposes.

The choice of immunization circuit (represented by block 6 in Fig. 2) will depend upon three main factors, namely:

(*a*) The amount, if any, of low frequency interference present in the video amplifier input signal, (*b*) Whether negative or positive or both polarities of noise are to be considered, (*c*) The degree of immunity desired from the effects of impulsive noise.

If the arrangement is to cater for both polarities of noise present in the signal it will in general, be more complex than if only one polarity has to be dealt with but, in many cases, only one polarity will have to be considered. For example, in the television systems at present in use in some countries (e.g. Great Britain), only positive modulation of television transmission is employed and therefore only positive impulsive noise has to be considered and, therefore, in applying this invention to receivers for receiving such television transmissions, the immunization circuit need be designed to deal with positive going noise only. In some other countries (i.e. U.S.A.) negative modulation is employed in television transmission and thus, in applying the invention to receivers for receiving such transmissions the immunization circuit need deal only with negative going noise. On the other hand, both polarities of noise may be present and effective to produce erroneous clamping, for example on coaxial cables carrying telephony and on some frequency modulated radio links and in such cases the immunization circuit may need to be designed to immunize against both polarities of noise.

Fig. 3 shows one form of immunization circuit, suitable for providing protection against positive going impulsive noise only. Terminals 7, 9 and 10 correspond to points 7, 9 and 10 of Fig. 2. The circuit comprises two valves 11 and 12 connected as a cathode coupled pair, the video signal being fed from 9 to the control grid of valve 11 and clamping pulses being fed from 7 to the control grid of valve 12. The video signal reference voltage (i.e. the voltage to which synchronization pulses are referred) is D.C. restored by a circuit comprising diode 13 before being applied to valve 11. As well known per se the arrangement is such that valve 11 only conducts when valve 12 is non-conductive i.e. when clamp pulses arrive at the control grid of the latter valve. Thus, again assuming that clamping is to occur during the back-porch period of the video signal, pulses will appear at the anode of valve 11 whose amplitude is proportional to the difference between that of the video signal back-porch level and the constant D.C. restoration level. Said anode pulses are passed through a clipper diode 14, the clipping potential of which is adjusted by means of a tap 15 on a potentiometer connected between HT positive and earth. The action of the clipper is such that only that part of an anode pulse above the clipping potential is passed on to output 10 as a reconstituted clamping pulse.

Now if, in Fig. 3, positive going impulsive noise is present in the video signal during a back-porch period, the resulting pulse at the anode of valve 11 will have a very much smaller amplitude than normal and consequently all the pulse will be below the clipping level of diode 14 and a clamp pulse will not appear at output 10. This state of affairs is represented in the wave forms by the presence of impulsive noise during the second back-porch period at 9 and the absence of the second reconstituted clamp pulse at 10.

A more complex circuit, for dealing with either polarity of noise, or both, is shown in block form in Fig. 4 in which terminals 7, 9 and 10 correspond to the similarly annotated terminals at Figure 2. Block 16 represents a circuit for producing a pulse signal whenever impulsive noise is present during the television signal clamping period and comprises a subsidiary clamping stage controlled by clamp pulses fed in along lead 17. The detailed circuit of block 16 will be described later.

The output of block 16 is fed to a phase-splitter stage 18, detailed in Fig. 5. Referring to Fig. 5, a positive output pulse from 16 is shown applied to the control grid of a phase-splitter valve 5A. The anode and cathode outputs of said valve are passed through rectifiers 5B and 5C respectively and combined across a resistor 5D. As will be seen, the rectifiers are arranged in such a way that only negative pulses will appear across resistor 5D, i.e. with the waveforms shown, only 5B conducts whereas if the input to valve 5A was of negative polarity, only 5C would conduct.

Reverting to Fig. 4, the output from stage 18, which is the voltage across resistor 5D of Fig. 5, is used to control the operation of a gating stage 19. This stage may comprise any one of many well known forms of gating circuit, e.g. a cathode-coupled pair. Clamp-pulses are fed, from terminal 7, into gating stage 19 which normally passes said pulses through to its output. When, however, a control pulse from stage 18 is present, stage 19 is rendered inoperative for the duration of said pulse, thus interrupting the passage of clamp pulses. The resulting train of clamp-pulses appears at terminal 10 to be employed as afore-described with reference to Fig. 2.

As will be apparent when the circuit of stage 16 is described, the output of said stage may be either a short pulse lasting no longer than the duration of a clamp pulse or a longer pulse lasting for at least as long as the time interval between the end of one clamp pulse and the beginning of the next.

The circuit of block 16, Fig. 4 may take various forms but is preferably as described in applicant's co-pending application 29,690/55 as it has the great advantage that substantially no time delay is introduced between the output and input. For the sake of completeness, this circuit is reproduced in Fig. 6 of the accompanying drawings and will now be briefly described. Referring to Fig. 6 terminals 9 and 17 correspond to terminals 9 and 17 of Fig. 4, the television signal, comprising impulsive noise, entering at 9 and clamp control pulses, solely for controlling the action of a part of the circuit, at 17. Input television signals, after passing through a cathode follower 6A are clamped by a double-diode clamping stage 6B, said stage being controlled by clamp pulses obtained from the output of a phase-splitter 6C. After clamping, the signal is passed through a further cathode follower 6D and fed to the control grid of a valve 6E. Valve 6F, connected to valve 6E to form a cathode-coupled pair, has applied to its control grid the unclamped television signal derived from the tap of a potentiometer 6G, in the cathode circuit of valve 6A. Thus clamped and unclamped television signals are subtractively combined by the cathode-coupled pair leaving a pulse signal, dependent in time and amplitude upon the impulsive noise, at the output 6H.

As shown by the waveforms in Fig. 6 the television signal input at 9 includes a negative pulse of impulsive noise coinciding with the back-porch period of the second line synchronizing pulse. Thus clamp 6B will have its action distorted in just the way that the invention seeks to avoid. (This clamp is merely a subsidiary stage and not, of course, the final stage where immunization will be obtained.) Thus, the clamped signal, shown at the output of cathode follower 6D, will have its reference level shifted by an amount dependent upon the amplitude of the noise pulse and the output at 6H will be a pulse of amplitude dependent upon the amount that said level is "shifted." The time duration of said output will differ according to whether the impulsive noise occurs entirely during, or overlaps the time of clamping at 6B. In the latter case the signal reference level will be "shifted" when the clamp operates in the presence of impulsive noise and will remain so until the next clamping operation has commenced resulting in an output at 6H of rectangular pulse form, the leading edge of which corresponds to the first mentioned clamping operation and the lagging edge to the second mentioned operation. This condition is shown in the figure. In the former case, the reference level is only "shifted" during the clamping period when noise is actually present, resulting in a short pulse output at 6H.

It has already been explained how the embodiments of the invention so far described may be made to operate in the presence of low frequency interference, by rearranging the input to unit 6 of Fig. 2 in the manner shown by the broken line connection in that figure. This method, however, may not remove the said interference to a sufficient degree in some circumstances and where a higher degree of removal of low frequency interference is required a different method is preferable. In such cases, the basic arrangement of Fig. 2 is used, with the input to unit 6 obtained from point 2 and said unit comprising a circuit as detailed in Fig. 7.

Referring to Fig. 7, units 16, 18, and 19 are as described with reference to Fig. 4. As disclosed in applicant's aforementioned co-pending application the circuit of unit 16 is capable of detecting low frequency interference and if the television signal input at 9 comprises both impulsive noise and low frequency interference, the output of said unit will comprise a stepped, low frequency signal on which is super-imposed pulses corresponding to impulsive noise. This output is differentiated in a simple differentiating circuit 20 and the train of differentiated pulses is fed to phase-splitter 18 which converts the pulses into pulses of one desired polarity (as shown, negative). After conversion the pulses are taken to a clipper stage 21 which passes only the parts of those pulses above a predetermined lever. Said level is, of course, arranged to be high enough not to pass pulses due to low frequency interference. The output of clipper 21 is of too short a time duration, due to the effects of differentiation, to operate gate 19 directly and so it is used as a trigger pulse to trigger off a rectangular pulse generator 22, which may be one of many well known per se, e.g. a monostable multivibrator, and the output of said generator is used to operate gate 19.

I claim:

1. A pulse controlled electrical circuit arrangement comprising in combination a pulse producing means, including a subsidiary clamping stage controlled by clamping control pulses, fed with signals including impulsive noise and adapted to produce a pulse whenever such noise coincides in time with a control pulse, a phase splitter stage fed with pulses from said pulse producing means said phase splitter stage including an electron tube having at least a cathode, a control grid and an anode, a pair of rectifiers having a common load resistance and fed one from the anode and the other from the cathode of the aforesaid tube of said phase splitter stage, and a gating stage fed with the clamping control pulses and controlled by the pulsed voltage set up across said load resistance to be cut off thereby.

2. A pulse controlled electrical circuit arrangement comprising in combination a pulse producing means, including a subsidiary clamping stage controlled by clamping control pulses, fed with signals including impulsive noise and adapted to produce a pulse whenever such noise coincides in time with a control pulse, a differentiating circuit fed with the output from said means, a phase splitter stage fed with the output from the differentiating circuit said phase splitter stage including an electron tube having at least a cathode, a control grid and an anode, a pair of rectifiers having a common load resistance and fed one from the anode and the other from the cathode of the aforesaid tube of said phase splitter stage, a clipper stage fed with voltage from across said common load resistance and adapted to pass only amplitudes above a predetermined level high enough to exclude amplitudes due to low frequency interference and a gating stage fed with the clamping control pulses and controlled by the output from the clipper stage to be cut off thereby.

3. An electronic noise interference eliminator for electric circuit arrangements adapted to receive electric signals subject to impulsive noise, said circuit arrangements being controlled by pulses, comprising an electron tube circuit constituting a phase splitter, said tube circuit including at least a cathode, a control grid and an anode, means governed by control pulses for producing a pulse whenever impulsive noise is present during periods of control by said control pulses, means to apply said noise produced pulses to the phase splitter, two rectifiers having a common load resistance, said rectifiers being connected one to the anode and one to the cathode of said phase splitter, a gate circuit, means for applying the output of the phase splitter to the gate circuit, and means for applying the control pulses to said gate circuit whereby said gate is closed by the application of the pulse from said phase splitter.

4. A pulse controlled electrical circuit arrangement as claimed in claim 3 wherein said pulse producing means comprise a double rectifier clamp to which the signals including impulse noise are fed and which is controlled by clamping control pulses fed thereto via said phase splitter, a cathode coupled pair of valves, means for applying the clamped signal output from said double rectifier clamp to the grid of one of said pair of valves, means for applying said signals (unclamped) including impulse noise to the grid of the other of said pair of valves and means for taking off from the anode of said second of said pair of valves, output pulse signals which are dependent in time and amplitude upon the impulsive noise.

References Cited in the file of this patent

UNITED STATES PATENTS

| | | |
|---|---|---|
| 2,450,818 | Vermillion | Oct. 5, 1948 |
| 2,459,798 | Dettman | Jan. 25, 1949 |
| 2,564,017 | Maggio | Aug. 14, 1951 |
| 2,683,803 | Keizer | July 13, 1954 |
| 2,761,130 | Kibler | Aug. 28, 1956 |
| 2,781,445 | Stocker | Feb. 12, 1957 |
| 2,792,496 | Rhodes | Mar. 14, 1957 |
| 2,843,662 | Rieke | July 15, 1958 |